Dec. 27, 1966     S. G. ENDERS     3,293,740

METHOD OF PRODUCING A HOLE SAW MANDREL

Filed June 16, 1964

INVENTOR
SHERWOOD G. ENDERS

BY *Leonard Bloom*

ATTORNEY

United States Patent Office 3,293,740
Patented Dec. 27, 1966

3,293,740
METHOD OF PRODUCING A HOLE SAW MANDREL
Sherwood G. Enders, Bowley's Quarters, Md., assignor to The Black and Decker Manufacturing Company, Towson, Md., a corporation of Maryland
Filed June 16, 1964, Ser. No. 375,616
6 Claims. (Cl. 29—475)

The present invention relates to a method of producing a hole saw mandrel, and has for its basic objects, a simplicity of components, an ease of assembly, and a resultant economy of manufacture.

Hole saw mandrels are used in conjunction with a substantially cup-shaped tubular hole saw blade having cutting teeth formed along its exposed circular periphery and further having a base portion which is secured to the mandrel and driven thereby. The mandrel comprises a generally cylindrical body portion, a screw-threaded projection intended to be received within a central aperture formed in the base portion of the hole saw, and a hexagonal shank by means of which the overall assembly may be driven by a suitable socket carried by a portable electric drill or other tool. A pair of diametrically-disposed drive pins are mounted for relative axial sliding movement on the mandrel body; and in their advanced position, the pins are received within respective apertures formed in the base portion of the hole saw, thereby providing a positive driving connection between the mandrel and the hole saw.

In the prior art of which I am aware, hole saw mandrels have been commercially produced in generally two different methods: one, by machining the entire mandrel from a relatively-large diameter workpiece; and two, by forming the body portion of the mandrel separately from its hexagonal shank and then securing the two pieces together. The first method resorted to in the prior art requires an extensive amount of machining; and hence is very expensive, if not impractical. The second prior art method invariably requires the broaching of a blind hexagonal hole within the mandrel body; and hence is awkward, time consuming, and expensive.

The present invention alleviates the deficiencies of these prior art methods are facilitates a convenient and economical assembly of a hole saw mandrel.

In accordance with the teachings of the present invention, a method for producing a hole saw mandrel is herein illustrated and described; and this method comprises the steps of providing a mandrel shank having a polygonal cross-section, forming a mandrel body with a central aperture, the minimum width of which is less than the maximum width of the shank as measured across its longitudinal edges, placing a meltable braze element on the shank and inserting the shank within the central aperture in the mandrel body, such that the braze element is trapped within the body, and such that the longitudinal edges of the shank score the central aperture in the mandrel body and form longitudinal ridges therein, and finally heating the assembly such that the braze element melts and flows along the longitudinal ridges in the central aperture in the mandrel body.

Preferably, but not necessarily, the mandrel shank has a hexagonal gross-section and is formed from ordinary mill stock; and the body portion of the mandrel has a bore and a communicating counterbore with an internal annular shoulder between the two, such that the braze element, which preferably comprises a split wire ring, is disposed mutually between the internal annular shoulder on the mandrel body and an external annular groove formed on the mandrel shank.

These and other objects of the present invention will become apparent from a reading of the following specification, taken in conjunction with the enclosed drawings, in which.

Figure 4:
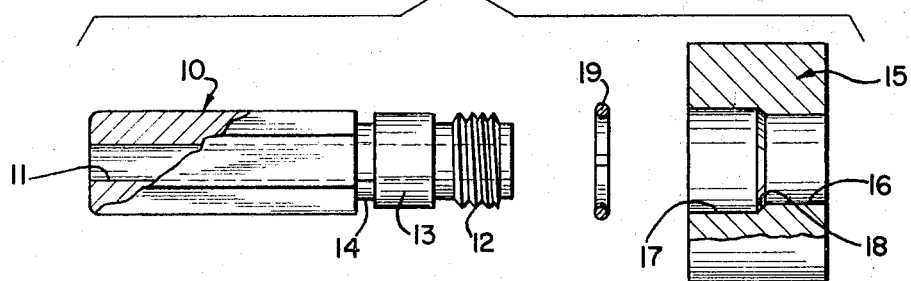
Figures 5, 7:
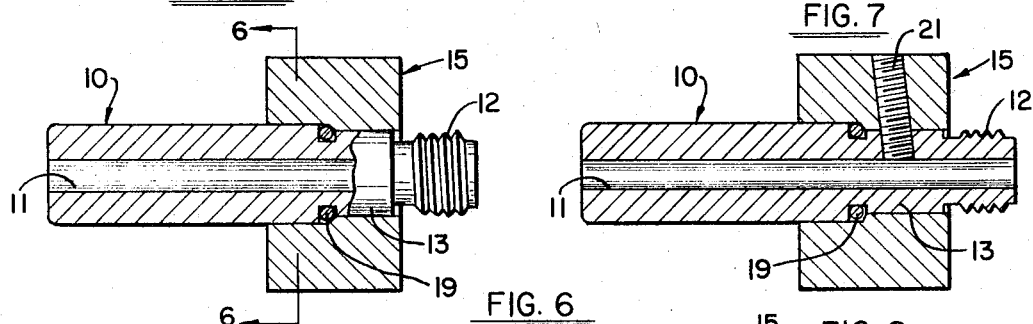
Figures 6, 8, 9:
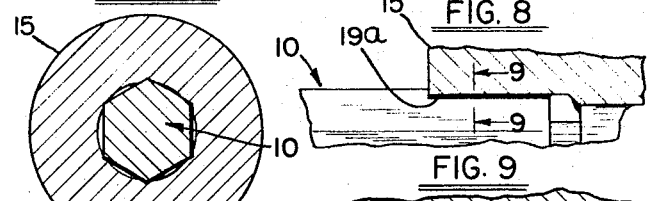
Figure 10:
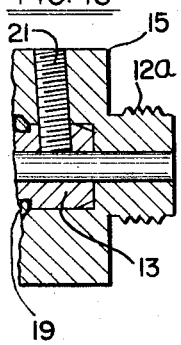
Figure 11:
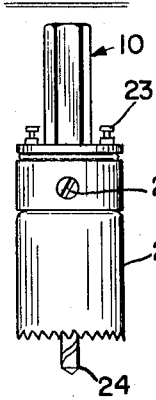
Figure 6A:
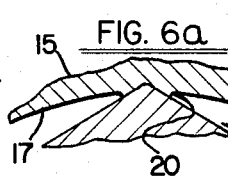

FIGURE 4 is an exploded view of the basic components, showing the hexagonal bar formed with an axial bore, a threaded end portion, a cylindrical portion having a round diameter, and an external annular groove between the round diameter and the remaining portion of the hexagonal shank, and also showing the braze ring and the cylindrical mandrel body, the latter being formed with a bore and a communicating counterbore therein;

FIGURE 5 is a longitudinal section of the components of FIGURE 4 in assembled relationship, the cylindrical portion of the hexagonal shank being press-fitted within the bore of the mandrel body, and the braze ring being mutually disposed between the external annular groove on the mandrel shank and the internal annular shoulder on the mandrel body;

FIGURE 6 is a section view taken along the lines 6—6 of FIGURE 5, showing the manner in which the longitudinal edges of the hexagonal shank score the wall of the counterbore in the mandrel body and thus form a series of longitudinal ridges internally in the mandrel body, it being appreciated that the width of the hexagonal shank measured across its side edges is greater than the inner diameter of the counterbore formed in the mandrel body;

FIGURE 6a is an enlarged fragmentary portion of FIGURE 6, showing the formation of the internal longitudinal ridges in the counterbore of the mandrel body;

FIGURE 7 is a longitudinal section of the assembly, substantially the same as that of FIGURE 5, but showing a subsequent operation in which a transverse hole is bored and tapped in the mandrel body and the adjacent portion of the mandrel shank so as to ultimately receive a set screw for retaining the pilot drill within the longitudinal bore formed in the mandrel shank;

FIGURE 8 is a longitudinal section corresponding to that of FIGURE 7, but showing the manner in which the braze ring melts during a subsequent dip brazing and heat-treating operation;

FIGURE 9 is a detail section view taken along the lines 9—9 of FIGURE 8, showing the manner in which the braze material flows longitudinally along the internal ridges formed in the mandrel body counterbore;

FIGURE 10 is a modification of the hole saw mandrel of FIGURE 8, showing the manner in which the screw-threaded projection is formed as part of the cylindrical mandrel body rather than being formed on the end of the mandrel shank; and FIGURE 11 is a side elevation of the completed hole saw mandrel to which the hole saw blade is secured.

Figure 2:
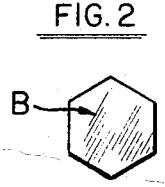
FIGURE 2 is an end elevation of the hexagonal bar of FIGURE 1.
Figures 1, 3:
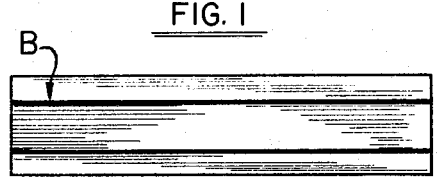
FIGURE 1 is a side elevation of an ordinary hexagonal bar as obtained from the mill.
FIGURE 3 is a side elevation of a cylindrical workpiece from which the mandrel body may be machined.

With reference to FIGURES 1 and 2, there is illustrated a portion of an ordinary bar stock B, preferably having a hexagonal cross-section and from which a mandrel shank may be machined, while in FIGURE 3 there is illustrated a cylindrical workpiece W from which a mandrel body may be machined.

A hexagonal mandrel shank 10, see FIGURE 4, is machined from the bar stock B and is provided with an axial bore 11 (for receipt of the usual pilot drill in the completed assembly), a screw-threaded end portion 12, a cylindrical portion 13 having a round diameter, and an external annular groove 14 between the cylindrical portion and the remainder of the hexagonal shank. A mandrel body 15, see FIGURE 4 again, is machined from the cylindrical workpiece W and is provided with a bore 16, a communicating counterbore 17, and an internal annular shoulder 18. The machining operations may be performed on an automatic screw machine or its equivalent.

A braze ring 19, which preferably comprises a meltable split wire ring, is seated within the external annular groove 14 on the mandrel shank 10; and the mandrel shank is press-fitted within the cylindrical mandrel body 15, such that its cylindrical portion 13 is press-fitted within the bore 16, and such that the braze ring 19, see FIGURE 5, is disposed mutually between the internal annular shoulder 18 on the mandrel body and the external annular groove 14 on the mandrel shank.

Moreover, the width of the mandrel shank 10, as measured across the longitudinal edges of its hexagonal cross-section, is greater than the inner diameter of the counterbore 17 in the cylindrical mandrel body 15; and thus, in the press-fitting of the mandrel shank within the body, a plurality of longitudinal ridges 20, see FIGURES 6 and 6a, are formed within the wall portion of the counterbore 17 for a purpose hereinafter to be described.

The assembly is then provided with a transverse hole 21, see FIGURE 7, which is suitably bored and tapped for ultimately receiving (in the completed assembly) a set screw to retain the usual pilot drill. Next, the assembly is heated, such that the braze ring 19 melts as at 19a, and flows longitudinally, see FIGURES 8 and 9, along the internal ridges 20 formed within the counterbore in the mandrel body.

Preferably, the assembly is brazed and simultaneously heat-treated (or hardened) in a cyanide-salt bath, such that in addition to the brazing operation, a through hardening is provided on the mandrel shank 10 and a case hardening on the mandrel body 15, it being noted that the shank, but not the body, is made from a steel having a relatively-higher degree of hardenability.

A modification is illustrated in FIGURE 10. Here, a screw-threaded projection, denoted as at 12A, is formed as part of the cylindrical mandrel body, rather than as part of the mandrel shank.

A completed hole saw assembly is shown in FIGURE 11. A substantially cup-shaped hole saw blade 22 is secured to the mandrel assembly and is positively driven by means of a pair of drive pins 23. The manner in which the blade 22 is driven by the pins 23 forms no part of the present invention, but further details may be obtained in the co-pending Enders application, Ser. No. 375,615, filed June 16, 1964, now Patent No. 3,267,975, entitled "Coupling Means for Hole Saw Assembly," and assigned to the assignee of the present invention. Moreover, the hole saw blade may be tubular and replaceable as is described in the co-pending Enders application, Ser. No. 351,078, filed March 11, 1964, now Patent No. 3,262,474, entitled "Hole Saw Assembly," and assigned to the assignee of the present invention. Also, in FIGURE 11, the pilot drill 24 is shown along with its retaining set screw 25.

Obviously, many modifications may be made without departing from the basic spirit of the present invention; and accordingly, within the scope of the appended claims, the invention may be practiced other than has been specifically described herein.

I claim:

1. The method of producing a hole saw mandrel, which comprises the steps of:

(a) providing a mandrel shank from ordinary bar stock having a polygonal cross-section;
(b) forming an axial bore in the shank, whereby a pilot drill may be inserted in the completed mandrel;
(c) forming a cylindrical portion of reduced diameter on the shank;
(d) forming a mandrel body with a bore and a counterbore therein, whereby an internal annular shoulder is formed between the bore and counterbore, and whereby the diameter of the counterbore is less than the greater width of the shank measured across its longitudinal edges;
(e) placing braze ring on the shank between the round diameter and the remaining portion of the polygonal shank;
(f) press-fitting the shank into the mandrel body, whereby the cylindrical portion of the shank is received in the bore of the mandrel body, the braze ring is disposed against the internal annular shoulder on the body, and the longitudinal edges of the shank score the wall of the counterbore in the mandrel body and form respective longitudinal ridges therein;
(g) drilling and tapping a transverse hole through the mandrel body and shank, whereby a set screw may be received therein in the completed assembly for holding the pilot drill in place; and
(h) brazing and simultaneously heat-treating the assembly, whereby the braze runs along the longitudinal ridges in the counterbore in the mandrel body, and whereby the assembly is hardened to a desired degree.

2. The method of claim 1, wherein:
(a) a screw-thread is formed on the end of the shank forwardly of the cylindrical portion of the shank, the screw-thread being disposed forwardly of the mandrel body in the completed assembly.

3. The method of claim 1, wherein:
(a) a screw-threaded projection is formed on the mandrel body forwardly of its bore.

4. The method of claim 1, wherein:
(a) the shank has a hexagonal cross-section.

5. The method of claim 1, wherein:
(a) an external annular groove is formed on the shank between its cylindrical portion and the remaining polygonal portion of the shank, whereby the braze ring is seated in the groove.

6. The method of claim 1, wherein:
(a) the assembly is dip brazed and simultaneously hardened in a cyanide-salt bath.

References Cited by the Examiner
UNITED STATES PATENTS

| | | | |
|---|---|---|---|
| 2,018,073 | 10/1935 | Laise | 29—501 X |
| 2,197,039 | 4/1940 | Gottlieb | 29—500 X |
| 2,721,592 | 10/1955 | Baker | 143—85 X |
| 3,138,183 | 6/1964 | Stewart | 143—85 X |
| 3,146,813 | 9/1964 | Dirksen | 143—85 X |
| 3,220,449 | 11/1965 | Frankling | 143—85 X |

JOHN F. CAMPBELL, *Primary Examiner.*

L. J. WESTFALL, *Assistant Examiner.*